United States Patent [19]

Grahl

[11] 4,285,154
[45] Aug. 25, 1981

[54] TIP-UP FLAG DEVICE FOR ICE FISHING

[76] Inventor: Paul F. Grahl, Rte. 1, Eden, Wis. 53019

[21] Appl. No.: 77,935

[22] Filed: Sep. 24, 1979

[51] Int. Cl.³ .............................................. A01K 97/01
[52] U.S. Cl. ......................................................... 43/17
[58] Field of Search .............................. 43/15, 16, 17

[56] References Cited

U.S. PATENT DOCUMENTS

| | | | |
|---|---|---|---|
| 2,654,176 | 10/1953 | Kachelski et al. | 43/17 |
| 2,720,719 | 10/1955 | Stancheck et al. | 43/17 |
| 2,759,287 | 8/1956 | Urban | 43/16 |
| 2,786,294 | 3/1957 | Whitacre | 43/17 |
| 3,352,048 | 11/1967 | Fleming | 43/17 |
| 3,641,693 | 2/1972 | Pinnow | 43/17 |
| 4,021,958 | 5/1977 | Snodie | 43/17 |

Primary Examiner—Stephen G. Kunin
Assistant Examiner—Robert P. Olszewski

[57] ABSTRACT

A signalling device for use when ice fishing which includes a flag that is retained in a generally horizontal retracted position when the device is set for use and moved to an upright signalling position when the fish takes the hook and pulls fishing line from a reel. The device also includes a frame supported on the ice in transverse relation to an ice hole in which the frame includes a unique structure which enables it to be easily lifted from the ice even if it is placed on the ice surface when the surface is somewhat slushy and becomes frozen to the ice thereby facilitating the fisherman pulling out a fish or removal of the device when it is desired to leave the fishing area. The reel on which the fishing line is mounted includes a guide having unique structure enabling the fishing line to be easily associated therewith and a drive shaft and tripping arm arrangement at the upper end thereof releasably engaging a spring biased flag wire or mast for releasing the flag for movement from its retracted position to its signalling position.

4 Claims, 6 Drawing Figures

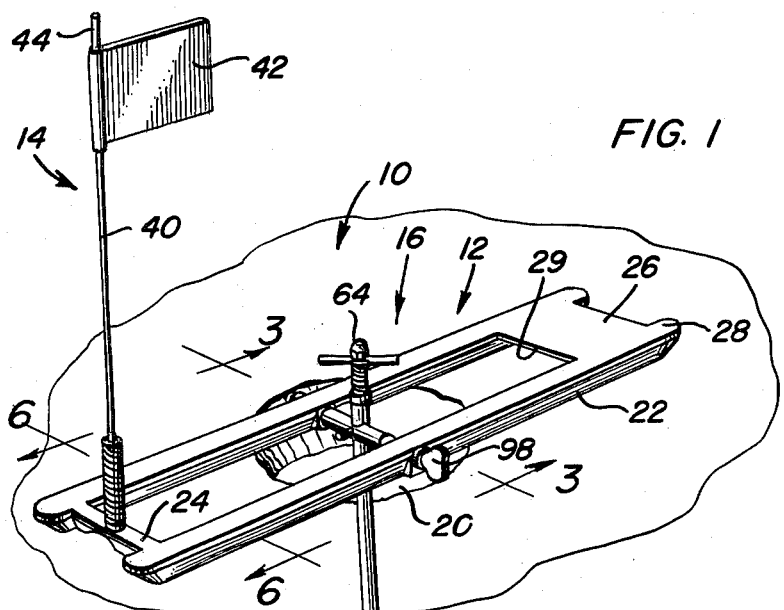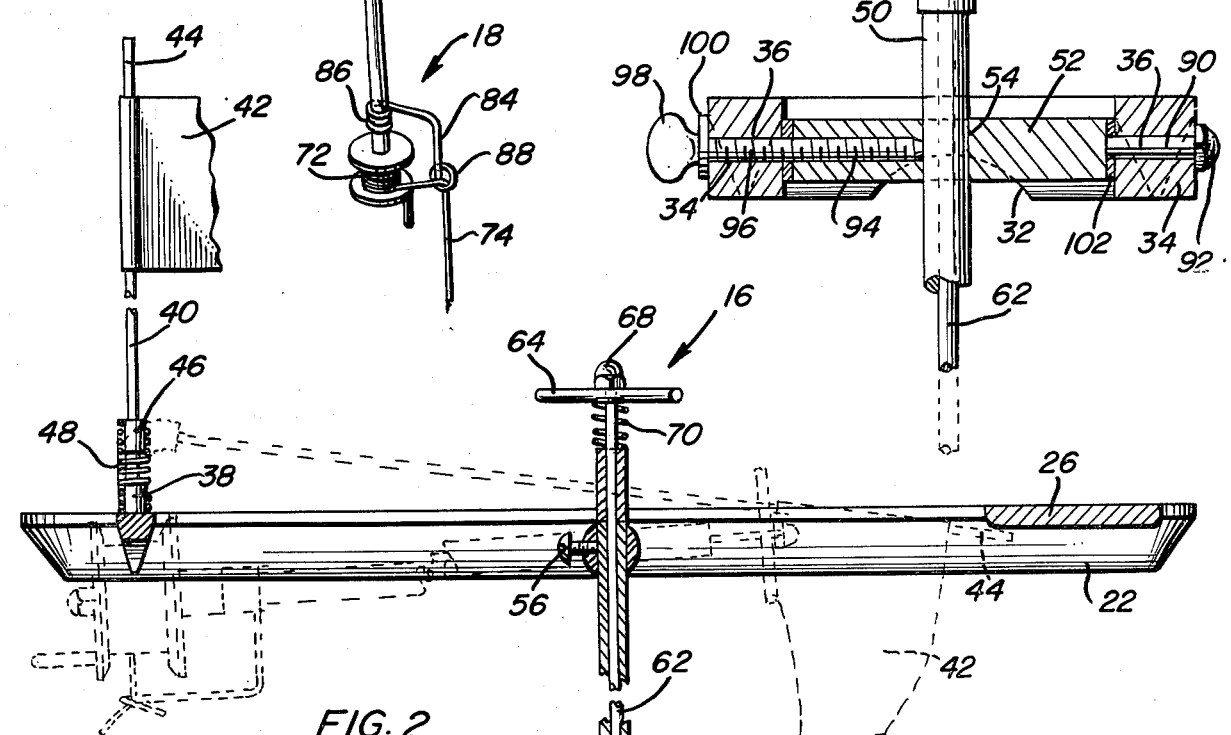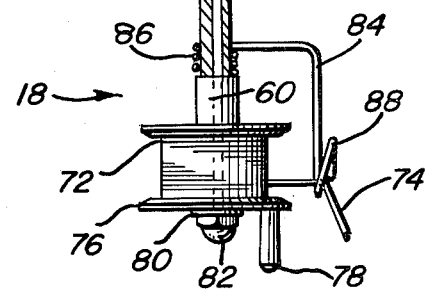

TIP-UP FLAG DEVICE FOR ICE FISHING

BACKGROUND OF THE INVENTION

1. Field of the Invention

The present invention generally relates to a tip-up flag device for ice fishing incorporating a unique base frame supporting the tip-up device and a unique retaining and release structure for the flag to retain it in retracted position and release it when a fish unreels fishing line from a reel on which the line is wound.

2. Description of the Relevant Art

Signalling devices of various types have been used with fishing apparatus in order to signal to the fisherman that a fish has taken the hook and pulled fishing line from the fishing reel. When ice fishing through a hole in the ice, a retracted signalling device, such as a signal flag, is retained in its non-signalling position by various structural arrangements. The following U.S. patents disclose structures which are relevant to ice fishing signal devices.

| U.S. Pat. Nos: | 2,608,783 | Sep. 2, 1952 | Rogers |
|---|---|---|---|
| | 2,636,303 | Apr. 28, 1953 | Feigley et al |
| | 2,654,176 | Oct. 6, 1953 | Kachelski et al |
| | 2,720,719 | Oct. 18, 1955 | Stancheck et al |
| | 3,352,048 | Nov. 14, 1967 | Fleming |
| | 3,641,693 | Feb. 15, 1972 | Pinnow |
| | 4,021,958 | May 10, 1977 | Snodie. |

SUMMARY OF THE INVENTION

An object of the present invention is to provide a tip-up flag device for ice fishing which includes a frame having spaced, generally parallel rails of substantially V-shaped configuration which enables the frame to be removed from the ice surface even though the lower edges of the rails may be frozen into the ice inasmuch as the V-shaped configuration thereof will enable the frame to be popped out of the ice in view of the configuration of the rails and the plastic material from which the rails are constructed.

Another object of the invention is to provide a tip-up flag device for ice fishing in accordance with the preceding object in which the signalling flag is supported from a mast or wire attached to the frame by a coil spring arrangement to enable the flag mast to be pivoted to a stored position alongside of the top surface of the frame and also to be positioned in a similar set position so that when the flag mast is released it will be spring biased to an upstanding signalling position.

Still another object of the invention is to provide an ice fishing signalling device in which a unique releasing and retaining assembly is provided for the flag mast and which includes a rotatable reel, drive shaft and cross arm or tripping shaft at the upper end thereof under which the flag mast is positioned when set so that rotation of the reel by a hooked fish unreeling fishing line therefrom will release the flag mast.

A further object of the invention is to provide a signalling device in accordance with the preceding objects in which the resistance to rotation of the reel will be determined by the orientation of the flag mast on a particular side of the rotational axis of the drive shaft since the pivot point of the flag mast is below the tripping shaft so that the flag mast serves as a cam engaging the tripping shaft, thus either facilitating its rotation in one direction or resisting its rotation in the other direction.

Another very important object of the present invention is to provide a tip-up flag for ice fishing which is simple in construction, easy to use, effective and long lasting and having many unique and novel features facilitating the use of the device when ice fishing.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the tip-up flag device for ice fishing illustrating the device in use with the flag in upright signalling position.

FIG. 2 is a longitudinal, sectional view of the structure of FIG. 1.

FIG. 3 is a transverse, sectional view taken substantially along section line 3—3 of FIG. 1 illustrating the center shaft and related structure.

DESCRIPTION OF THE PREFERRED EMBODIMENTS

Figure 4:
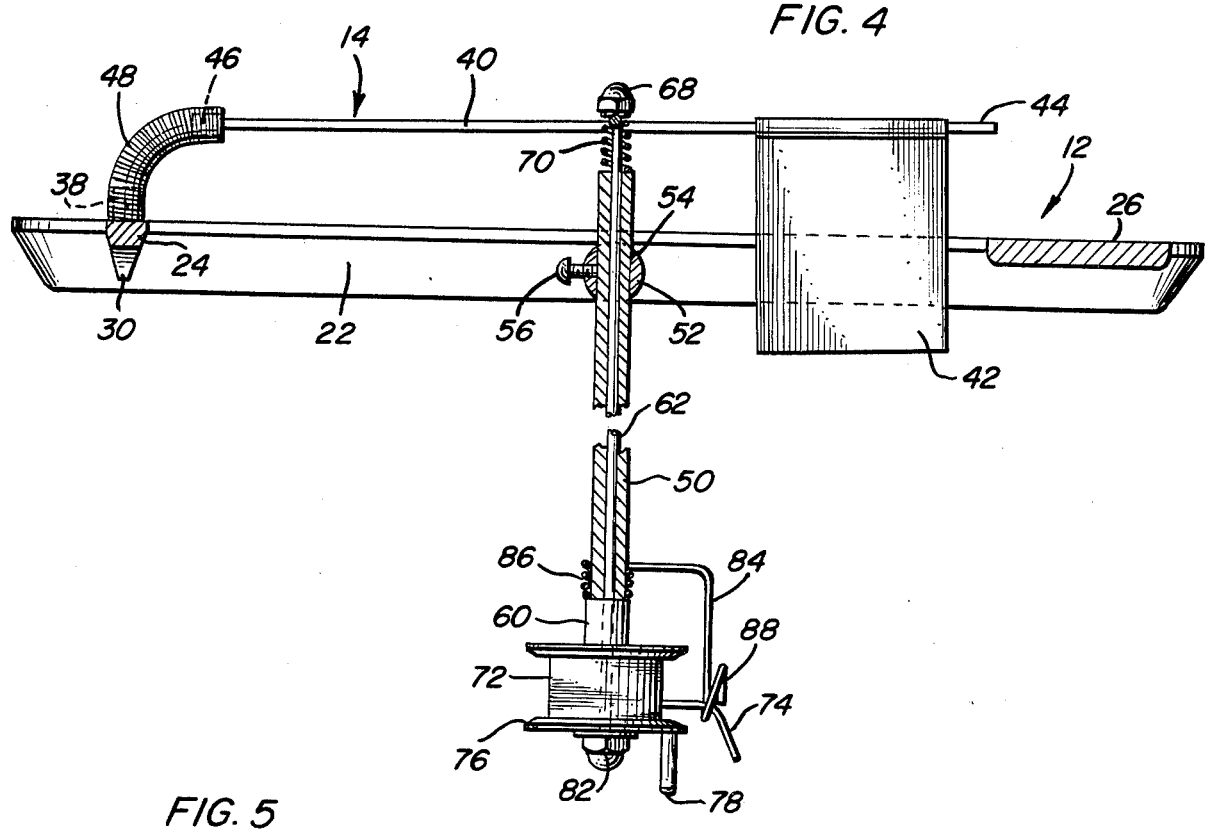
FIG. 4 is a longitudinal sectional view similar to FIG. 2 but with the flag and mast in "set" position.

Referring now specifically to the drawings, the tip-up flag device for ice fishing of the present invention is generally designated by the numeral 10 and includes a supporting base or frame 12 with a flag assembly 14 at one end thereof, a releasing and retaining assembly 16 intermediate the ends thereof and a depending operating mechanism 18 for the releasing and retaining assembly 16. In using the device, the frame 12 is positioned in supporting engagement with an ice surface in straddling transverse relation to an ice fishing hole 20 with the operating mechanism 18 depending through the hole 20 in a well-known manner.

The frame 12 includes a pair of substantially parallel, transversely spaced rails 22 which are interconnected at one end by a transverse end member 24 and interconnected adjacent the opposite ends by a transverse plate 26. As illustrated, the rails 22 extend beyond the end member 24 and the plate 26 to define protrusions 28 which allows the frame to be used as a wrapping board so that when the fisherman is through fishing, the fishing line can be wound end-for-end on the board thus hastening removal and storage of the equipment when the fisherman's hands are cold.

Figure 6:
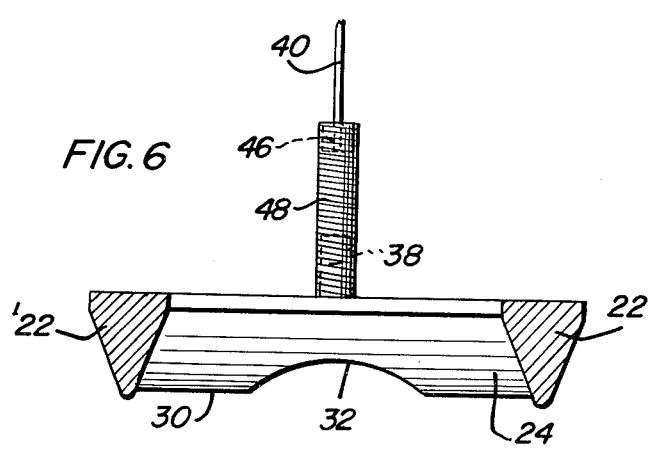
FIG. 6 is a transverse, sectional view taken substantially along a plane passing along section line 6—6 of FIG. 1 illustrating further structural details of the frame rail and notched cross piece for receiving the reel when in stored position.

Each of the rails 22 is of V-shaped cross-sectional configuration as best illustrated in FIG. 6 which provides for an easy lift feature. When the frame 12 is placed in the slush around the ice hole 20, it can be positioned easily by pushing the frame slightly into the slush. Thus, the lower edge portions of the V-shaped rails are frozen in the ice, but when the fisherman goes to pull out a fish or leave the fishing area, the tip-up device will easily pop out of the ice because of the V-shape of the frame rails. The frame 12 is of one piece molded construction of plastic material which renders the frame durable and tough when exposed to low temperature conditions. Also, the frame has a wood grain texture which enhances the appearance of the plastic material with the top surfaces of the rails 22 and the top surfaces of the plate 26 and end member 24 being substantially planar. The hollowed center portion, designated by numeral 29 provides both lightness and compactness in storage and also allows proper functioning of the flag assembly, releasing and retaining assembly and operating mechanism in a manner described hereinafter. The transverse end member has the lower edge thereof truncated as at 30 so that it is above the lower edge of the rails 22 and a central generally arcuate notch 32 is provided therein for a purpose described hereinafter and centrally of each of the rails, there is an enlargement or boss 34 formed thereon with a through hole or bore 36 being provided through the enlarged area with the bores being in transverse alignment with each other. Centrally on top of the transverse end member 32, there is a unitary upstanding peg 38 which provides a support for the flag assembly 14.

The flag assembly 14 includes an elongated flag wire or mast 40 having a flag 42 adjacent the upper end thereof with the flag wire 40 extending above the flag 42 with this upper extending end of the flag wire being designated by numeral 44. The flag 42 is constructed of a natural material having a red plastic coating on both sides to allow ease of visibility in the snow. The material is glued to the wire with an appropriate glue to keep the flag from slipping on the wire with the flag being approximately one-half inch from the end of the wire so that the extension 44 on the wire can be placed under the plate 26 forming part of the frame 12 when in the transport or stored position as illustrated in FIG. 2. The lower end of the wire 40 is embedded in a nylon sleeve 46 which is disposed in spaced relation to the peg 38 and a coil spring 48 grips the peg and nylon sleeve thus resiliently connecting the nylon sleeve and the flag wire 40 or mast 40 to the peg 38 and enabling pivotal resilient swinging movement of the flag wire or mast 40. The spring 48 is a close wound spring which provides enough strength to lift the flag or even signal lights, or the like, placed thereon, but it is soft enough to allow the flag to rise gently thus eliminating most vibration in the frame. While dimensions may vary, a flag wire approximately 14½ inches long has been found to provide adequate visibility at a distance when the flag is released.

The releasing and retaining assembly 16 and the operating mechanism 18 includes an elongated tube 50 which extends through a center mounting shaft 52 having a transverse central bore 54 therein. The tube is secured vertically adjustably in position in the transverse bore 54 by a lock screw 56 which screw threads through the center mounting shaft 52 into the bore 54 and thus frictionally engages the exterior of the tube 50. The upper end of the tube 50 is provided with a top tube cap 58 and the lower end of the tube 50 is provided with a bottom tube cap 60 both of which are permanently affixed to the respective ends of the tube. Freely rotatably journaled in the tube 50 is a drive shaft 62 that has ends extending longitudinally above and below the ends of the tube 50. The upper end of the drive shaft 62 is threaded into an internally threaded central opening in a transversely extending trip shaft 64 which has a central flattened area 66 at its undersurface with the internally threaded bore through the trip shaft being threaded on the threaded upper end of the drive shaft 62 and locked in place by a top cap 68 in the form of an acorn nut. The length of the trip shaft 64 is less than the distance between the frame rails and a cushioning spring 70 encircles the upper end of the drive shaft 62 and is interposed between the upper end of the top tube cap 58 and the flattened recess 66 in the lower edge of the trip shaft 64 so that the drive shaft can move downwardly slightly in relation to the tube by compressing the cushioning spring 70.

The lower end of the drive shaft 62 has a reel or spool 72 thereon which is constructed of plastic material with a fishing line 74 being wound on the reel. The reel flanges have chamfered or tapered inner peripheral edges 76 to facilitate the fishing line 74 being wound onto or removed from the reel and the lower flange of the reel 72 is provided with a depending off set handle 78 to facilitate rotation thereof. The reel 72 is retained in place on the drive shaft by pressing the reel onto the drive shaft and utilizing a lock washer 80 and a bottom end cap 82 engaged with the lower end of the shaft 62 which may be either threaded or the nut or cap 82 pressed into place. A line guide 84 is mounted on the tube by a plurality of spring convolutions 86 which are loosely mounted on the tube 50 so that the line guide can swing freely in relation to the tube and reel. The lower end of the line guide is in the form of a loop 88 in alignment with the reel 72 with the loop providing an easy lock feature for the line by virtue of the wire loop 88 being bent in a 1¼ circle with the end of the wire left a shot distance from the wire coming down to the reel. This allows the fisherman to place the fishing line 74 easily into the line guide, yet it is difficult for the line to slip out of the line guide when placed in the water. When the fisherman is ready to leave the fishing area, he or she can easily remove the line from the line guide by hand for a more rapid removal of the line from the water.

Figure 5:
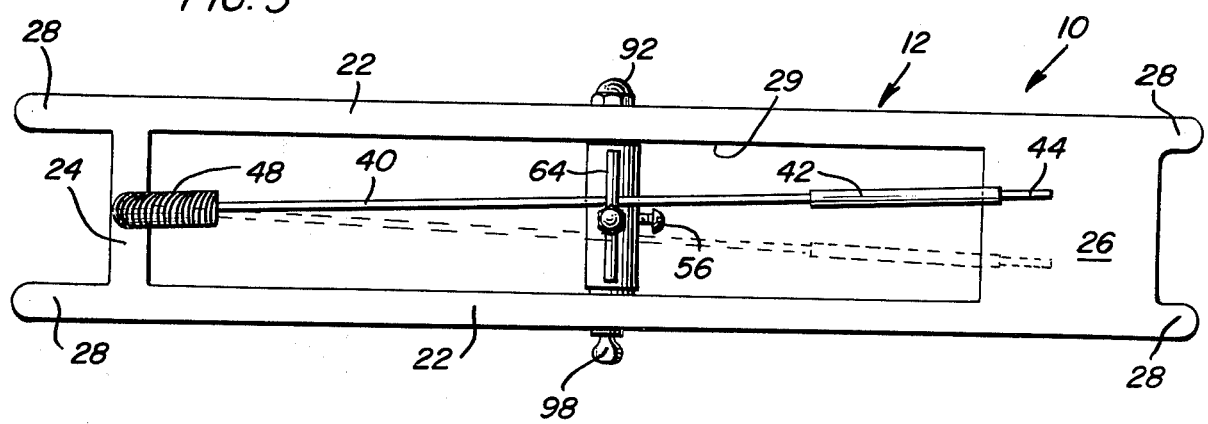
FIG. 5 is a plan view of the device illustrating the alternate orientation of the flag mast on opposite sides of the axis of rotation of the drive shaft.

With this construction, whenever the line 74 is pulled, such as by a fish taking the bait or striking the hook, the reel 72 will be rotated thus causing the trip shaft 64 to be rotated to release the flag assembly which has been placed in the "set" position by the flag wire or mast 40 being placed under the tripping shaft 64 as illustrated in FIGS. 4 and 5.

As illustrated in FIG. 3, the center mounting shaft 52 includes a projecting rigid shaft 90 which is moved through the bore 36 in one side of the frame and a press on acorn nut 92 is positioned on the end of the stub shaft 90. The other end of the center mounting shaft is provided with an internally threaded or tapped bore 94 which receives a thumb-type lock screw 96 which is threaded into the hole 96 and includes a thumb actuator 98 on the outer end thereof and an integral washer 100 which will clamp the center mounting shaft 52 in adjusted angular position with lock washers 102 being provided between the ends of the shaft 52 and the enlargements 34 on the rails 22.

When the device is to be stored, the flag mast or wire 40 is folded downwardly with the extension 44 positioned under the inner edge of the plate 26 as illustrated in FIG. 2. Also, the thumb nut or screw 98 may be loosened and the shaft 52 pivoted about a transverse axis until the periphery of the reel is engaged with the notch 32 and the thumb screw 98 is retightened thus orienting the components in a stored or transport position. When it is desired to use the device, the thumb nut 98 is loosened and the shaft 52 adjusted until the tube extends generally vertically downwardly from the frame and the thumb nut retightened. The flag wire 40 is removed from under the plate 26 and engaged under the trip shaft 64 as illustrated in FIG. 4 after the fishing line 74 has been positioned in the guide loop 88.

The cushion spring at the upper end of the drive shaft provides a shock absorbing structure which prohibits the fish from feeling any movement in the trip shaft and any rising impact when the flag goes up. The top tube cap 58 has a passageway therethrough slightly larger than the diameter of the drive shaft which compensates for any discrepancies in the drive shaft thus allowing the drive shaft to turn smoothly at all times. This cap may be pressed onto the tube 50. The tube 50 has a thin wall which retains it as light as possible but yet thick enough for durability. The inside diameter of the tube is such to allow lubricant to pass between the drive shaft and the tube yet substantially prohibiting water from flowing into the tube which may otherwise freeze the drive shaft solid to the tube thus preventing the trip shaft from turning when the fish pulls the line on the reel which normally turns the reel, drive shaft and trip shaft which releases the flag wire from its set position under the trip shaft to a straight up signalling position telling the fisherman that a fish is on the line.

The line guide 88 is one-quarter more than a full circle which prevents a float equipped line 74 from floating out of the guide which occurs frequently when the guide is open at the top. This structure allows the fisherman to easily place his line into the line guide, but yet it is difficult for the line to slip out of the line guide when placed in the water. When the fisherman is ready to leave the fishing area, the line may be quite easily removed from the line guide. To provide a driving connection between the reel and the shaft, the shaft may be provided with small flattened ears which embed themselves in the internal diameter of the plastic reel which is a conventional procedure in securing plastic members to shafts, and the like. When the device is set, the flag wire is placed under the trip shaft 64 so that the wire is on a slight angle as illustrated in FIG. 4. The angle runs upward from the close wound spring to the tip of the wire, that is, the wire diverges outwardly from the spring end of the flag wire. This feature provides two tripping characteristics without incorporating angles on the trip shaft. Depending upon which way the line is wrapped on the reel, the flag wire can be set on either side of the trip shaft, as illustrated in FIG. 5. On one side of the axis of rotation, the trip shaft 64 has to climb the wire providing a harder trip thus increased resistance to rotation, whereas on the other side, the trip shaft 64 can go down the wire 40 allowing the trip shaft to move at the greatest of ease and with less rotational force exerted thereon. These two settings are used when fishing certain types of fish and using certain types of bait. The entire assembled weight of the tip-up device is very small which together with the compactness of the device when in stored position enables the fisherman to carry a number of the tip-up devices to a fishing site, thus enhancing the pleasure of fishing and increasing the chance of catching fish.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An ice fishing signalling device comprising an elongated base frame adapted to rest on an ice surface in transverse relation to a hole therein, an upwardly extending signalling device mounted on said frame for movement between an upstanding signalling position and a position adjacent the upper surface of the frame, and means mounted on said frame releasably retaining said signal device in its position adjacent the upper surface of the frame, said retaining means comprising a generally vertically disposed drive shaft rotatably supported from the frame, a spool on the lower end of the drive shaft having a fishing line wound thereon, a guide associated with the spool and receiving the line so that a fish moving the fishing line outwardly will rotate the drive shaft, means vertically adjustably supporting the drive shaft from the frame for pivotal movement about a transverse axis, and a transverse tripping member on the upper end of the shaft and adapted to receive the signalling device thereunder when the signalling device is disposed in its position adjacent the upper surface of the frame and releasing the signalling device upon rotation of the drive shaft, said guide for the fishing line including a loop having an extent greater than one convolution and having a free end enabling the fishing line to be placed therein but preventing the fishing line from floating out of the loop, said means supporting the drive shaft including a vertical tube, a transverse center shaft on said frame and receiving said tube to enable the tube, drive shaft, tripping member and spool to pivot to a collapsed position generally coextensive with the elongated frame to enable the device to be transported and stored in a compact condition, said frame being provided with a hollow central portion defined by a pair of frame rails with the shaft supporting the tube extending between the rails and adjustably secured therebetween, said frame rails being of substantially V-shaped configuration to enable the frame to be lifted from the ice even though the lower edges thereof may be frozen into the ice.

2. The structure as defined in claim 1 wherein a plate interconnects the upper surface portion of one end of the rails and a transverse end member remote from the plate interconnecting the other ends of the rails thereby forming a rigid frame with the rails projecting beyond the transverse end member and the plate to provide protrusions to provide a winding board on which a fishing line may be wound with the length of the frame forming a fast winding means to enable the fishing line to be rapidly wound onto the frame even when the hands of a fisherman are cold.

3. An ice fishing signalling device comprising an elongated base frame adapted to rest on an ice surface in transverse relation to a hole therein, an upwardly extending signalling device mounted on said frame for movement between an upstanding signalling position and a position adjacent the upper surface of the frame, and means mounted on said frame releasably retaining said signal device in its position adjacent the upper surface of the frame, said retaining means comprising a generally vertically disposed drive shaft rotatably supported from the frame, a spool on the lower end of the drive shaft having a fishing line wound thereon, a guide associated with the spool and receiving the line so that a fish moving the fishing line outwardly will rotate the drive shaft, means vertically adjustably supporting the drive shaft from the frame for pivotal movement about a transverse axis, and a transverse tripping member on the upper end of the shaft and adapted to receive the signalling device thereunder when the signalling device is disposed in its position adjacent the upper surface of the frame and releasing the signalling device upon rotation of the drive shaft, said guide for the fishing line including a loop having an extent greater than one convolution and having a free end enabling the fishing line to be placed therein but preventing the fishing line from floating out of the loop, said means supporting the drive shaft including a vertical tube, a transverse center shaft on said frame and receiving said tube to enable the tube, drive shaft, tripping member and spool to pivot to a collapsed position generally coextensive with the elongated frame to enable the device to be transported and stored in a compact condition, said transverse tripping member being in the form of a transverse rod mounted on the upper end portion of the drive shaft, a coil spring encircling the upper end portion of the drive shaft and interposed between the tripping member and the upper end portion of the vertical tube to provide a resilient shock absorbing structure between the supporting tube and drive shaft for reducing any impact vibrations being transmitted to the fishing line when the signalling device is released from under the tripping member.

4. The structure as defined in claim 3 wherein said signalling device includes a flag supported on a flag mast, a coil spring interconnecting the lower end of the mast and the frame with the coil spring forming an extension of the mast and defining a transverse pivot to enable the mast to be pivoted to a position underlying the tripping member with the pivot axis defined by the spring being slightly below the lower edge of the tripping member whereby the mast is on a slight upward angle from the spring toward the tripping member thereby enabling adjustment in the sensitivity of the signalling device by positioning the mast to a selected side of the rotational axis of the drive shaft with unwinding movement of the line from the spool rotating the shaft in a direction to cause the tripping member to either climb up the angle of the mast or proceed down the angle of the mast depending upon which side of the rotational axis the mast is placed on.

* * * * *